(12) United States Patent
Gerfers et al.

(10) Patent No.: US 8,499,630 B2
(45) Date of Patent: Aug. 6, 2013

(54) PIEZOELECTRIC SENSOR DYNAMIC RANGE IMPROVEMENT

(75) Inventors: Friedel Gerfers, Mountain View, CA (US); Li-Peng Wang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1332 days.

(21) Appl. No.: 12/059,009

(22) Filed: Mar. 31, 2008

(65) Prior Publication Data

US 2009/0241666 A1 Oct. 1, 2009

(51) Int. Cl.
*G01P 15/125* (2006.01)

(52) U.S. Cl.
USPC .......................................... 73/514.32; 73/509

(58) Field of Classification Search
USPC ........... 73/514.32, 493, 509, 514.01; 702/141
See application file for complete search history.

(56) References Cited

U.S. PATENT DOCUMENTS

| | | | | |
|---|---|---|---|---|
| 3,797,320 A | * | 3/1974 | Clampitt | 73/496 |
| 4,483,194 A | * | 11/1984 | Rudolf | 73/514.18 |
| 4,764,748 A | * | 8/1988 | Geen et al. | 341/131 |
| 4,839,650 A | * | 6/1989 | Geen et al. | 341/118 |
| 5,353,641 A | * | 10/1994 | Tang | 73/514.18 |
| 5,440,939 A | * | 8/1995 | Barny et al. | 73/862.61 |
| 5,447,068 A | * | 9/1995 | Tang | 73/514.32 |
| 5,473,946 A | * | 12/1995 | Wyse et al. | 73/514.18 |
| 5,600,066 A | * | 2/1997 | Torregrosa | 73/514.18 |
| 6,035,694 A | * | 3/2000 | Dupuie et al. | 73/1.38 |
| 6,035,714 A | * | 3/2000 | Yazdi et al. | 73/514.32 |
| 6,301,965 B1 | * | 10/2001 | Chu et al. | 73/514.18 |
| 6,386,032 B1 | * | 5/2002 | Lemkin et al. | 73/504.02 |
| 6,674,383 B2 | * | 1/2004 | Horsley et al. | 341/152 |
| 6,868,726 B2 | * | 3/2005 | Lemkin et al. | 73/514.32 |
| 6,933,873 B1 | * | 8/2005 | Horsley et al. | 341/148 |
| 7,042,288 B2 | * | 5/2006 | Matsui et al. | 330/174 |
| 7,337,671 B2 | * | 3/2008 | Ayazi et al. | 73/514.32 |
| 7,409,862 B2 | * | 8/2008 | Derbyshire | 73/514.32 |
| 7,617,729 B2 | * | 11/2009 | Axelrod et al. | 73/514.32 |
| 7,757,393 B2 | * | 7/2010 | Ayazi et al. | 29/847 |
| 7,865,337 B2 | * | 1/2011 | Hammerschmidt | 702/189 |
| 8,220,328 B2 | * | 7/2012 | Rudolf et al. | 73/514.01 |
| 2002/0175692 A1 | * | 11/2002 | Lasalandra et al. | 324/684 |
| 2003/0137221 A1 | * | 7/2003 | Radziemski et al. | 310/339 |
| 2004/0046484 A1 | * | 3/2004 | Schiller | 310/317 |
| 2004/0075498 A1 | * | 4/2004 | Matsui et al. | 330/174 |
| 2004/0212280 A1 | * | 10/2004 | Radziemski et al. | 310/339 |
| 2005/0206275 A1 | * | 9/2005 | Radziemski et al. | 310/339 |
| 2007/0163815 A1 | * | 7/2007 | Ungaretti et al. | 178/18.06 |
| 2007/0193355 A1 | * | 8/2007 | Axelrod et al. | 73/514.32 |

* cited by examiner

*Primary Examiner* — Peter Macchiarolo
*Assistant Examiner* — Samir M Shah
(74) *Attorney, Agent, or Firm* — Blakely, Sokoloff, Taylor & Zafman LLP

(57) ABSTRACT

A MEMS piezoelectric sensor comprises a plurality of capacitors some of which may be used for sensing and others used for feedback. The capacitors may be switched to connect or disconnect selected capacitors from the sensor. Embodiments convert a two port sensor into a four port sensor without significant changes in hardware design and improve SNR and correct for offset and out-of-axis errors due to process mismatch and variations.

6 Claims, 4 Drawing Sheets

PIEZOELECTRIC SENSOR DYNAMIC RANGE IMPROVEMENT

FIELD OF THE INVENTION

Embodiments of the present invention are directed to piezoelectric sensors and, more particularly, to differential piezoelectric sensors with improved range and reduced out of axis sensitivity and sensor offset.

BACKGROUND INFORMATION

Inertial sensors, such as accelerometers, have wide applications in many industries. Most notable perhaps being in the aerospace, military, and automotive industries. More recently, they may be found in computer video game controllers where the controller senses user body movements.

One type of traditional accelerometer is the mercury switch. Typically this comprises a sealed tube containing a pair of electrodes and a small amount of mercury. When the tube is tilted or the mercury otherwise accelerated it makes contact with the electrodes and completes an electrical circuit. This may be considered a type of one-bit accelerometer; one bit, because it's either on or off. Unfortunately, mercury is toxic and containment may be an issue. Further, such switches are relatively large, and cannot be fabricated by photolithography.

Accelerometers may be used to measure acceleration, vibration, and mechanical shock etc. Single-axis, dual-axis, and triple-axis accelerometers are available to measure acceleration as a vector quantity in one or more dimensions. Modern accelerometers may be fabricated as micro electro-mechanical system (MEMS) devices. MEMS accelerometers typically comprise a suspended cantilever beam or proof mass with some type of deflection sensing circuitry. As forces cause the accelerometer to accelerate/decelerate, inertia may cause the cantilever or proof mass to deflect relative to the frame or supporting structure of the rest of the device. The deflection quantity and direction may be sensed and measured to provide an acceleration vector.

Referring now to FIG. 1, there is shown a piezoelectric MEMS sensor which may be used to sense acceleration or vibration by converting mechanical energy into an electrical signal. The sensor may include a generally rigid frame 100 or support structure. Here the frame 100 is generally square, but other shapes are possible. A proof mass 102 is suspended at the center of the frame 100 by a plurality of arms 104 attached at the corners of the frame 100. A beam 106 surrounds the proof mass 102 within the frame and defines two capacitors 108 and 110 for each arm 104. Thus, the piezoelectric sensor shown in FIG. 1 comprises eight capacitors on chip.

As shown in FIG. 2, this arrangement forms a 2-port system with outputs Q1 and Q2. Capacitors on adjacent arms are 90° degrees apart from each other, such that out-off-axis components (caused by accelerations in x or y direction) are cancelled assuming all four capacitors (C1=C2=C3=C4 and C5=C6=C7=C8) are the same.

The above design may have several drawbacks. First, depending on the selected piezoelectric material, the piezoelectric sensitivity changes which results in a limited/reduced dynamic range. Thus, it may be beneficial to increase the overall signal-to-noise ratio (SNR) of the piezoelectric MEMS sensors.

Second, as shown in FIG. 2, the state-of-the-art sensor has two signal ports, Q1 and Q2, plus ground. However, for a high performance sensor, a fully differential sensing and feedback structure would be desirable.

Finally, any mismatch due to the processing causes C1≠C2≠C3≠ ... ≠C8. As a result one obtains a charge difference/imbalance (|Q1|≠|Q2|) resulting in an offset voltage at the output of the succeeding charge-to-voltage converter. In addition, the sensor gets sensitive to out-off-axis accelerations since these portions did not cancel due to ΔCx and ΔCy.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Described is MEMS sensor having increased overall dynamic range by varying the overall signal and feedback gain depending on the incoming signal/acceleration. A simple digital gain adjustment block forms an active feedback loop to the sensor such that depending on the internal signal levels of the decimator the number of sensing capacitors and feedback capacitors are altered.

Embodiments comprise techniques that improve upon current state-of-the-art sensor design with feedback schemes. First is a time-sharing technique that subdivides the sample period into a sense part where the capacitors are used for acceleration sensing, and a feedback part where the capacitors are used to feed back a reference voltage. Secondly parts of the sensor capacitors are used for sensing the acceleration while the other ones feedback the DAC signals. By using a switching sequence any mismatch term is canceled in first order in the time domain.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
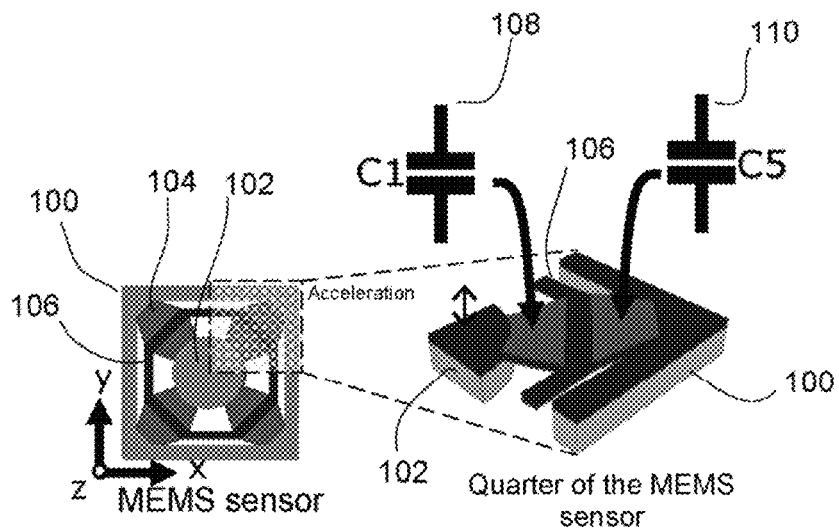
FIG. 1 is a MEMS piezoelectric sensor having eight capacitors and a two-port output.
Figure 2:
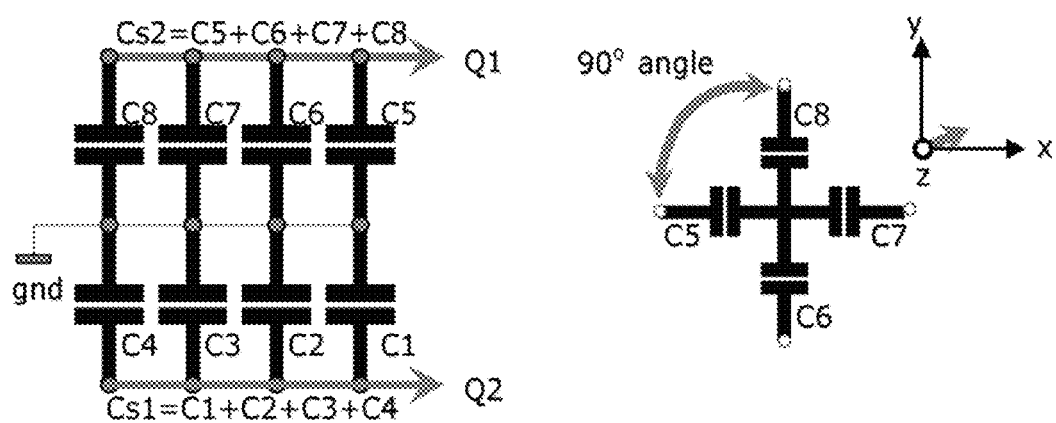
FIG. 2 is a circuit representation of the piezoelectric sensor showing sensor offset and out-of-axis sensitivity due to capacitive mismatch.
Figure 3:
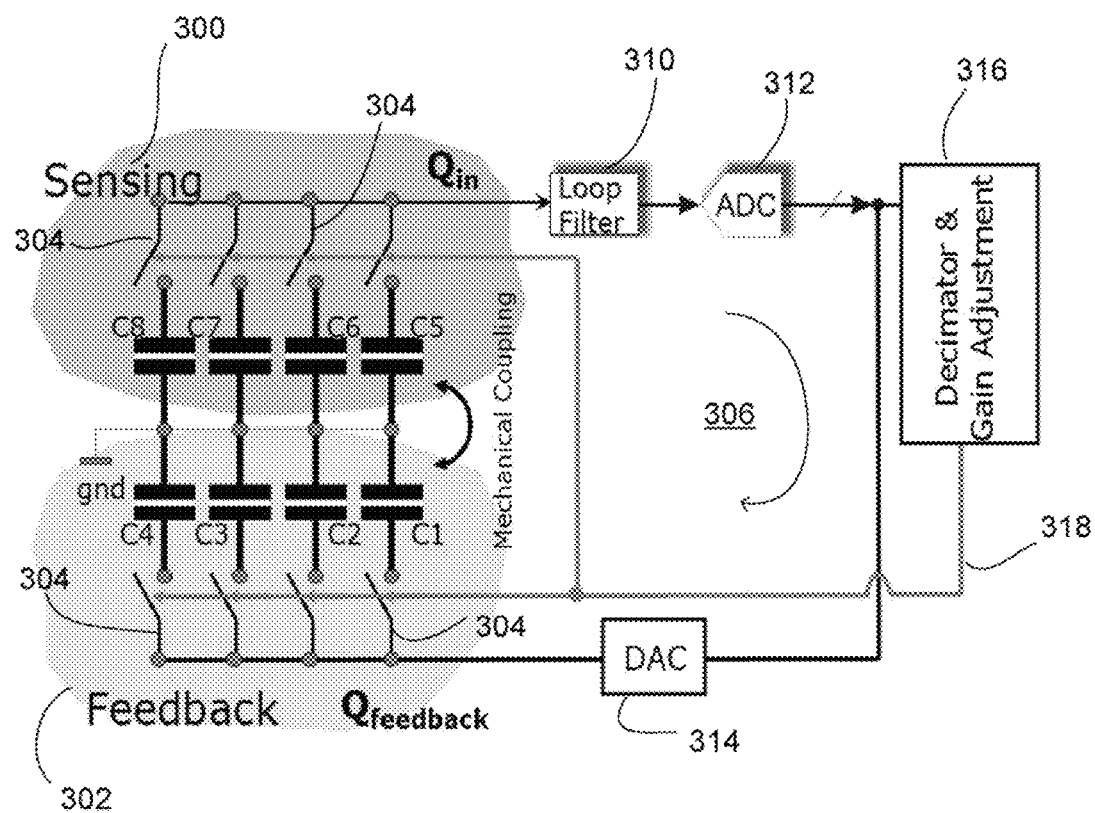
FIG. 3 shows one embodiment of a piezoelectric sensor having adjustable sensor gain/sensitivity that allows varying the overall input and feedback signal amplitude by changing dynamically the number of used capacitors.

FIG. 3 shows a schematic of a plurality of capacitors C1-C8 as they appear in a piezoelectric MEMS sensor, such as that shown in FIG. 1, with each of the four arms comprising a pair of capacitors C1-C5, C2-C6, C3-C7, and C4-C8 with the outer capacitors C5-C8 between the beam 106 and the frame 100 and the inner capacitors C1-C4 between the proof mass 102 and the beam 106.

Rather than using all eight capacitors for sensing, half of the capacitors are used for sensing and the other half of the capacitors are used for feedback 302. As shown, in this example the outer capacitors C5-C8 are used for sensing 300 and the inner capacitors C1-C4 are used for feedback 302. In addition, each capacitor C1-C8 may comprise a switch 304. Output from the sensing capacitors 304 is the input Qin to a ΣΔ feedback loop 306. The feedback loop 306 may comprise a loop filter 310 and analog-to-digital converter 312 and a digital to analog converter 314 to feed the signal back to the feedback capacitors 304. The output of the analog-to-digital converter 312 is input into a decimator and gain adjustment block 316. The decimator and gain adjustment block 316 then outputs switching signals 318 to connect or disconnect selected capacitors C1-C8 using the switches 304.

As shown, the loop 306 may vary the overall signal and feedback gain. The digital decimator and gain adjustment block 316 forms an active feedback loop to the sensor such that depending on the internal signal levels of the decimator 316 the number of sensing capacitors 300 and feedback capacitors 302 is altered to thus increase the overall signal to noise ratio (SNR). Adjustable sensor gain/sensitivity allows varying the overall input and feedback signal amplitude by changing dynamically the number of used capacitors. The gain adjustment is driven by a digital block that includes the decimation filter 316 such that the actual maximum amplitude is known so that by feeding back this information a maximal SNR improvement of (2 bit) or 12 dB is feasible.

Figure 4A:
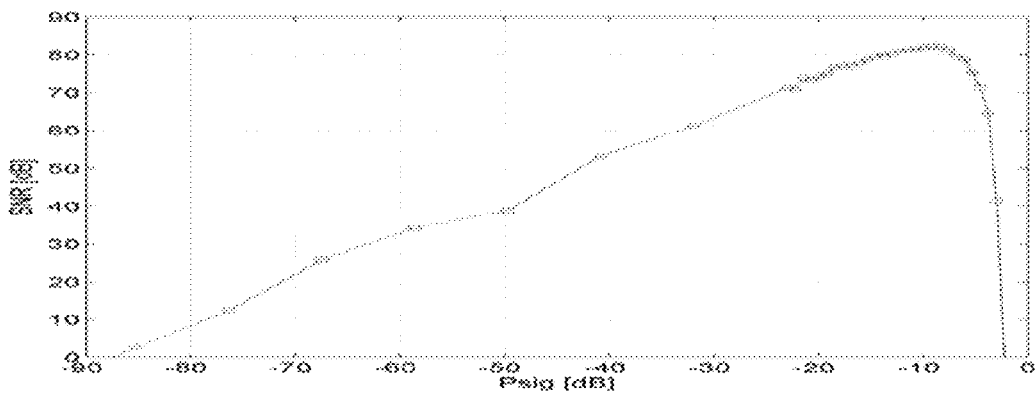
FIGS. 4A and 4B show the closed loop simulation of the SNR vs. input acceleration (Psig) without and with the gain adjusted, respectively.
Figure 4B:
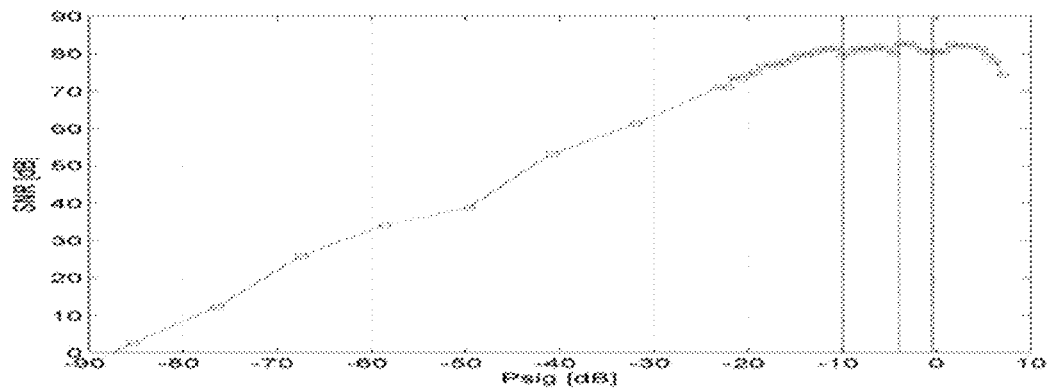
Figure 4C:
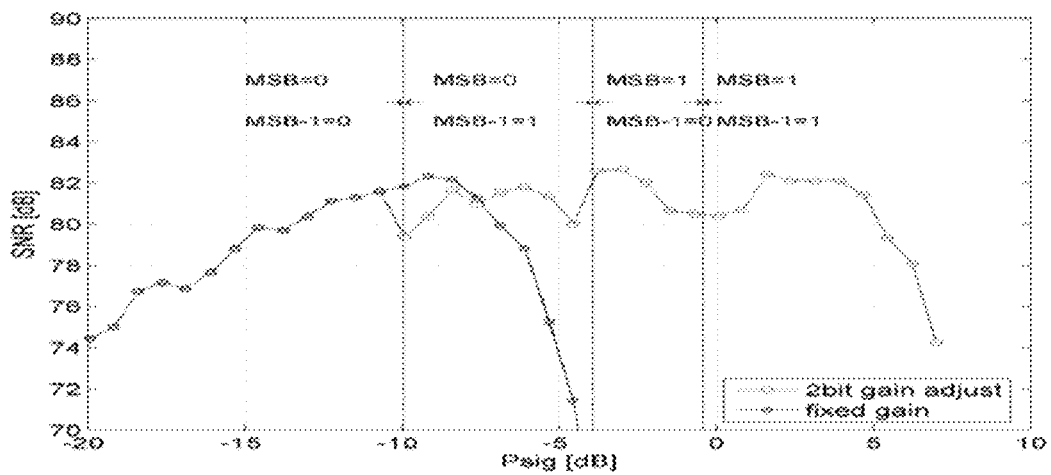
FIG. 4C is a graph showing a zoom view of SNR vs. input acceleration (Psig) without and with the gain on the same plot.

Since the sensor has four capacitors used for sensing 300, the maximal improvement is a factor of four which results in a two bit (or 12 dB) increase SNR. As shown in FIGS. 4A, 4B, and 4C, the SNR is plotted vs. the input acceleration (Psig). FIG. 4A shows the SNR plot without gain adjustment, such that the maximum SNR=82 dB is obtained at −8 dB input magnitude. FIG. 4B includes the gain adjustment and shows an SNR of 81 dB up to +5 dB. This is a SNR improvement of 13 dB (more than two bits).

FIG. 4C shows a zoom view within the SNR plot with and without gain adjustment. Here two MSB bits are introduced, which are set depending on the input amplitude. As a result, the SNR improves by more than 12 dB.

Figure 5:
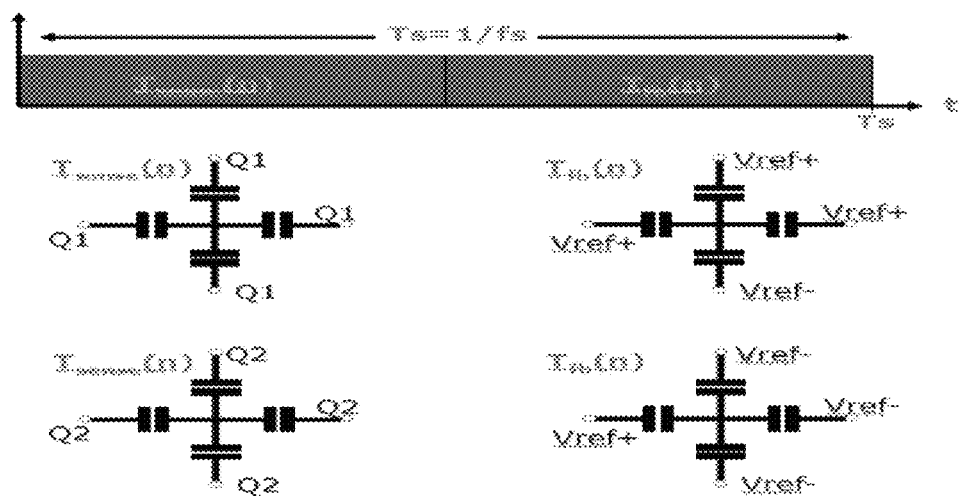
FIG. 5 shows a method for operating the sensor where a single sample period Ts may be divided such that the capacitors may be used for sensing during half the period and for feedback during the other half of the period according to one embodiment.

As noted above, the sensor as shown in FIG. 1 has two signal ports, Q1 and Q2, plus ground. However, for a high performance sensor readout a fully differential sensing and feedback structure would be desirable. Referring to FIG. 5, in another embodiment the two port system of FIG. 1 may be turned into a fully differential 4 port sensor with two ports for sensing and two ports for feedback.

As shown in FIG. 5, one embodiment may split each sample period Ts=1/fs into two parts (i.e. time-sharing); a sense period, Tsense, and a feedback period, Tfb. In the sense period the capacitors are used to sense fully differentially the input acceleration. In the second part, a feedback signal (e.g. a positive Vref+ or negative Vref− reference voltage) is connected to the sensor capacitors which close the ΣΔ loop.

Figure 6:
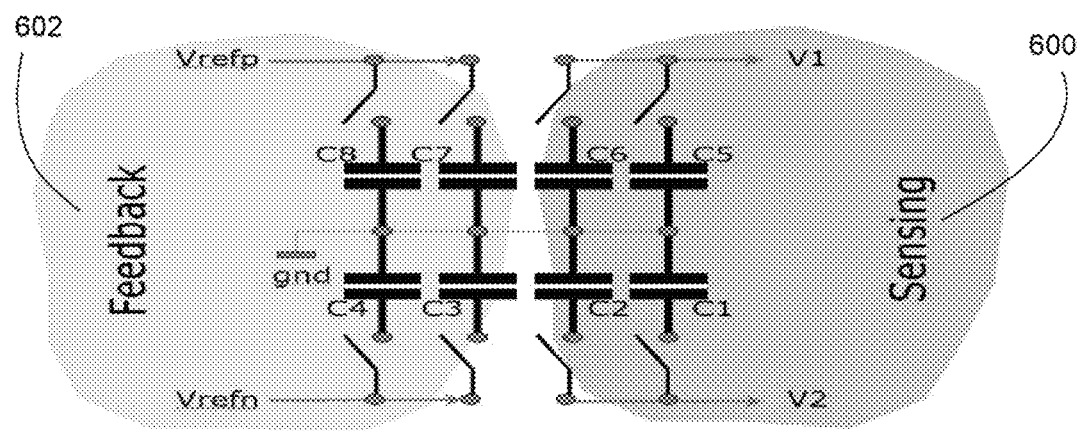
FIG. 6 a fully differential the sensor architecture using parts of the capacitors for sensing the acceleration while the other ones feedback the reference signal according to one embodiment.

In another embodiment as shown in FIG. 6, the sensor is split into a sensing part 600 and a feedback part 602 by separating capacitors for sensing and feedback. Here parts of the capacitors a used for sensing the acceleration while the other ones feedback the reference voltage.

Here, two sensor ports V1 and V2 are obtained from capacitors C1-C2 and C5-C6, respectively. Similarly, C7-C8 and C3-C4 may be used to feedback a positive reference voltage Vrefp and Vrefn, respectively. As a result a simultaneous read and feedback may be obtained.

Figure 7:
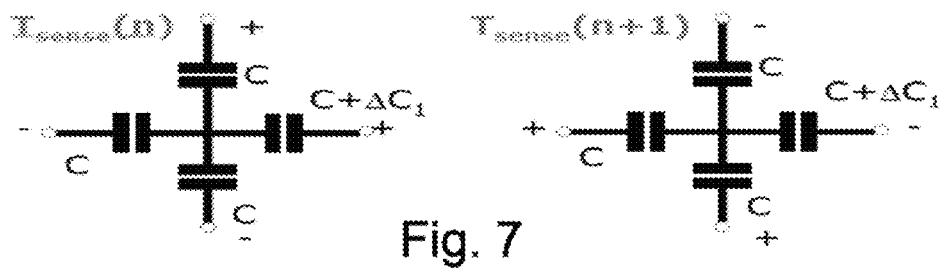
FIG. 7 shows a sensor using a switching sequence that compensates/cancels the error due to the capacitive mismatch according to one embodiment.

In yet another embodiment, as shown in FIG. 7, sensor offset and out-of-axis error is addressed. During the processing of the MEMS sensors, the piezoelectric structures may be subject to process mismatch and tolerances. As a result the sensor capacitors feature a mismatch term, e.g. ΔC1 of one side, resulting in an offset voltage and an increased out-off-axis sensitivity.

This problem may be addressed using a sensor architecture shown in FIG. 7 that applies a switching sequence such that the capacitors are rotated every sample instant. Here in the sample instant Tsense(n) the error term is added and in the next instant Tsense(n+1) the error term is subtracted (the charge mismatch due the ΔC1 term is compensated in time by rotating the polarity in two succeeding sense instances). Thus any mismatch term is compensate/canceled in first order in the time domain.

The proposed embodiments may be advantageous because they extend dynamic range but do not require a new sensor design nor increase the overall the hardware effort. The proposed techniques and fully differential sensor designs for simultaneous sensing and feedback do not require any additional hardware. The resulting errors due to offset components (due to ΔC and ΔForce) and increased out-of-axis (x and y-components) are canceled over time. This is possible, since high oversampling ratios (OSR) may be used, such that in average the errors are canceled.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A micro electromechanical system (MEMS) sensor, comprising:
    a frame;
    a beam;
    a proof mass;
    a plurality of arms connecting the frame to the proof mass;
    a plurality of capacitors, wherein each of said plurality of arms comprises an inner capacitor between the proof mass and the beam and an outer capacitor between the beam and the frame; and a plurality of switches, one connected to each of the capacitors for connecting or disconnecting selected capacitors, wherein a first half of said plurality of capacitors is used for outputting a sensor signal, and a second half of said plurality of capacitors is used for a feedback signal, wherein the plurality of switches cause the capacitors to operate so as to control an overall signal to noise ratio (SNR) of said MEMS sensor, wherein each sample period of said MEMS sensor is split into two periods, a sense period and a feedback period, and further wherein, in the sense period, the capacitors used to sense an input acceleration fully differentially, and, in the feedback period, the feedback signal is connected to the first half of said plurality of capacitors so as to form a closed feedback loop.

2. The sensor as recited in claim 1 wherein the feedback loop further comprises:

an analog sensor signal from the outer capacitors;

an analog to digital converter for converting the analog sensor signals into a digital sensor signal;

a decimator and a gain circuit receiving the digital sensor signal and controlling the plurality of switches; and a digital to analog converter for converting the digital sensor signal to an analog sensor signal which is fed back to the inner capacitors.

3. The sensor as recited in claim 2 further comprising:

a loop filter prior to the analog to digital converter.

4. The sensor as recited in claim 1 wherein the frame is generally square and the plurality of arms comprise one arm at each corner extending inward to the proof mass centered in the frame.

5. The sensor as recited in claim 4 wherein capacitors on a right side of the proof mass are used to output the sense signal and capacitors on a left side of the proof mass are used to receive feedback.

6. The sensor as recited in claim 5 wherein the feedback comprises one of a positive reference voltage and a negative reference voltage.

* * * * *